(12) United States Patent
Ge

(10) Patent No.: US 8,392,448 B2
(45) Date of Patent: Mar. 5, 2013

(54) METHOD AND APPARATUS FOR TRANSMITTING PACKETS IN THE NETWORK

(75) Inventor: Changzhong Ge, Beijing (CN)

(73) Assignee: Hangzhou H3C Technologies, Co., Ltd., Zhejiang (CN)

(*) Notice: Subject to any disclaimer, the term of this patent is extended or adjusted under 35 U.S.C. 154(b) by 251 days.

(21) Appl. No.: 12/646,129

(22) Filed: Dec. 23, 2009

(65) Prior Publication Data

US 2010/0174740 A1    Jul. 8, 2010

(30) Foreign Application Priority Data

Jan. 5, 2009   (CN) .......................... 2009 1 0076469

(51) Int. Cl.
*G06F 7/00* (2006.01)
*G06F 17/30* (2006.01)

(52) U.S. Cl. ...................................................... 707/769
(58) Field of Classification Search .................. 707/769, 707/622, 966, 967
See application file for complete search history.

(56) References Cited

U.S. PATENT DOCUMENTS

| | | | | |
|---|---|---|---|---|
| 7,401,152 | B2* | 7/2008 | Traversat et al. | 709/230 |
| 7,401,153 | B2* | 7/2008 | Traversat et al. | 709/230 |
| 7,574,523 | B2* | 8/2009 | Traversat et al. | 709/238 |
| 7,782,866 | B1* | 8/2010 | Walsh et al. | 370/395.31 |
| 7,783,777 | B1* | 8/2010 | Pabla et al. | 709/238 |
| 8,230,098 | B2* | 7/2012 | Chen et al. | 709/231 |
| 2002/0065919 | A1* | 5/2002 | Taylor et al. | 709/226 |
| 2005/0243818 | A1* | 11/2005 | Foglar et al. | 370/389 |
| 2006/0168123 | A1* | 7/2006 | Krstulich | 709/219 |
| 2006/0245424 | A1* | 11/2006 | Ramanathan et al. | 370/389 |
| 2007/0061487 | A1* | 3/2007 | Moore et al. | 709/246 |
| 2007/0097885 | A1* | 5/2007 | Traversat et al. | 370/254 |
| 2007/0112714 | A1* | 5/2007 | Fairweather | 706/46 |
| 2007/0136476 | A1* | 6/2007 | Rubinstein | 709/227 |
| 2007/0266169 | A1* | 11/2007 | Chen et al. | 709/231 |
| 2008/0069002 | A1* | 3/2008 | Savoor et al. | 370/241 |
| 2008/0091767 | A1* | 4/2008 | Afergan et al. | 709/202 |
| 2008/0320151 | A1* | 12/2008 | McCanne et al. | 709/228 |
| 2009/0113253 | A1* | 4/2009 | Wang et al. | 714/48 |
| 2009/0157899 | A1* | 6/2009 | Gagliardi et al. | 709/235 |
| 2009/0172762 | A1* | 7/2009 | Assouline et al. | 725/114 |
| 2010/0174740 | A1* | 7/2010 | Ge | 707/769 |
| 2010/0179940 | A1* | 7/2010 | Gilder et al. | 707/622 |
| 2010/0185753 | A1* | 7/2010 | Liu et al. | 709/219 |

FOREIGN PATENT DOCUMENTS

| | | |
|---|---|---|
| CN | 1859106 | 11/2006 |
| CN | 101141197 | 3/2008 |

* cited by examiner

*Primary Examiner* — Robert Beausoliel, Jr.
*Assistant Examiner* — Nicholas Allen

(57) ABSTRACT

The present invention provides a method and apparatus for packet transmission in the network. When the network device receives data packets from the first user, the network device extracts and saves the data encapsulated in the data packets and then forwards the packets according to the destination addresses of the data packets. When it receives the request from a second user for the data mentioned above, it encapsulates the saved data in data packets and sends the data packets to the second user. With the present invention deployed, the uploaded data packets are saved on network devices and can be directly transmitted to users requesting them. In this way, the present invention avoids repeated traffic upload, reduces upload traffic in the network, decreases network bandwidth occupied by traffic, and thus improves the overall network performance.

27 Claims, 6 Drawing Sheets

METHOD AND APPARATUS FOR TRANSMITTING PACKETS IN THE NETWORK

CROSS REFERENCE TO RELATED PATENT APPLICATIONS

The present application claims priority under 35 U.S.C. §119 to a corresponding patent application filed in China and having application number CN200910076469.2, filed on Jan. 5, 2009, the entire contents of which are herein incorporated by reference.

TECHNICAL FIELD

This invention relates in general to the field of network communications and more particularly to a method and apparatus for transmitting packets in a network.

BACKGROUND OF THE INVENTION

Currently, networks play more and more important roles in daily life, and the network performance directly affects network user experience. The network speed is a key performance index that affects user experience. However, restricted by finite network bandwidth, people attempt to develop various technologies that can improve packet transmission speed under the restrictions of finite bandwidth. For example, P2P, which improves data transmission speed through distributed data exchange, is very popular now. BitTorrent (BT) is a typical P2P application. Taking BT as an example, the following section describes how P2P works. Assume BT divides a file into several data segments, for example, A, B, and C, and allows clients 1 and 2 to download this file. Suppose client 1 connects to the server and randomly downloads segment A of the file, and client 2 connects to the server and randomly downloads segment B of the file. Then, client 1 can select to download segment B from client 2, which is faster than the server, according to the practical situation; likewise, client 2 can select to download segment A from client 1, which is faster than the server, according to the practical situation. That is, BT can make a client that has downloaded some data segments as the download base for other clients, thus reducing the download burden of the server and accelerating the download speed of each client.

With the popularity of P2P and the increase in requirements for music, video, and open-source software, networks are flooded with plenty of P2P traffic, more than 70% of the total traffic, which occupies massive bandwidth and affects the overall network performance.

SUMMARY OF THE INVENTION

The first objective of the present invention is to provide a method for processing traffic download in a P2P network, reduce upload traffic in the network, decrease network bandwidth occupied by P2P traffic, and thus improve the overall network performance.

The second objective of the present invention is to provide an apparatus for processing traffic download in a P2P network, reduce upload traffic in the network, decrease network bandwidth occupied by P2P traffic, and thus improve the overall network performance.

The third objective of the present invention is to provide a method for processing packets on network devices, reduce upload traffic in the network, decrease network bandwidth occupied by P2P traffic, and thus improve the overall network performance.

The fourth objective of the present invention is to provide an apparatus that can reduce upload traffic in the network, decrease network bandwidth occupied by P2P traffic, and thus improve the overall network performance.

To achieve the first objective, the present invention proposes the following solution: a method for processing data download in a P2P network, which sets up a segment table, and saves segment IDs and the corresponding data segments; upon receiving a download request carrying the download requester, the download provider, and the segment ID, the method queries the segment table for the data segment corresponding to the segment ID carried in the download request; if the data segment exists, the method constructs and returns a download response carrying the queried data segment to the download requester, and drops the received download request; otherwise, the method forwards the download request to the download provider; upon receiving a download response carrying the download requester, the download provider, the segment ID, and the data segment, the method queries the segment table for the data segment corresponding to the segment ID carried in the download response. If the data segment exists, the method forwards the received download response to the download requester; otherwise, the method adds the segment ID and data segment into the segment table, and then forwards the download response to the download requester.

In the solution mentioned above, the data segment contains n (an integer greater than 1) data sub-segments, and the download request or download response also carries a data sub-segment ID; the constructing and returning a download response carrying the queried data segment to the download requester comprises: upon receiving each download request carrying a data sub-segment ID, the method constructs a download response carrying the data sub-segment corresponding to the data sub-segment ID in the download request and returns the download response to the download requester; the adding the segment ID and data segment in the download response to the segment table comprises: upon receiving a download response carrying a data sub-segment ID and the corresponding data sub-segment, the method buffers the data sub-segment until the n data sub-segments are assembled into a complete data segment, and then saves the data segment and segment ID into the segment table.

In the solution mentioned above, the segment table also records the latest visit time of each segment; the querying the segment table for the data segment corresponding to the segment ID in the download request further comprises taking the current time as the latest visit time of the queried data segment and recording the time in the segment table; the adding the data segment in the download response to the segment table further comprises: taking the current time as the latest visit time of the newly-added data segment and recording the time in the segment table.

In the solution mentioned above, the segment aging time and the segment table traversal period are pre-configured, further comprising: when the set traversal period reaches, the method queries the latest visit time of each data segment in the segment table and checks whether the difference between the current time and the latest visit time is greater than the aging time: if yes, the method deletes the corresponding data segment entry; if not, the method performs no processing.

In the solution mentioned above, the storage capacity threshold is pre-configured for the segment table; before adding the segment ID and data segment in the download response to the segment table, the method further comprises: checking whether the current total storage capacity of the segment table is greater than the storage capacity threshold pre-configured for the segment table: if yes, the method determines a data segment with the oldest visit time according to the latest visit time, and deletes the entry corresponding to the determined data segment.

To achieve the second objective, the present invention proposes the following solution: an apparatus for processing data download in a P2P network, comprising: the storage unit, which saves the segment table mapping segment IDs to data segments; the control and processing unit, which operates as follows: upon receiving a download request carrying the download requester, the download provider, and the segment ID, the control and processing unit queries the segment table in the storage unit for the data segment corresponding to the segment ID carried in the download request. If the data segment exists, the control and processing unit constructs and returns a download response carrying the queried data segment to the download requester, and drops the received download request; otherwise, the control and processing unit forwards the download request to the download provider. Upon receiving a download response carrying the download requester, the download provider, the segment ID, and the data segment, the control and processing unit queries the segment table in the storage unit for the data segment corresponding to the segment ID carried in the download response. If the data segment exists, the control and processing unit forwards the received download response to the download requester; otherwise, the control and processing unit adds the segment ID and data segment into the segment table, and then forwards the download response to the download requester.

In the solution mentioned above, the control and processing unit comprises:

the message tracing unit, which operates as follows: upon receiving a download request carrying the download requester, the download provider, and the segment ID, the message tracing unit sends a query request carrying the segment ID to the segment table maintaining unit: if the message tracing unit receives a query success message with the queried data segment from the segment table maintaining unit, the message tracing unit sends the returned data segment to the segment transmitting unit, and drops the received download request; if the message tracing unit receives a query failure message from the segment table maintaining unit, the message tracing unit forwards the download request to the download provider. Upon receiving a download response carrying the download requester, the download provider, the segment ID, and the data segment, the message tracing unit sends a query request carrying the segment ID to the segment table maintaining unit: if the message tracing unit receives a query success message from the segment table maintaining unit, the message tracing unit forwards the received response to the download requester; if the message tracing unit receives a query failure message from the segment table maintaining unit, the message tracing unit sends an add request carrying the segment ID and data segment in the received response to the segment table maintaining unit, and forwards the received download response to the download requester;

the segment table maintaining unit, which operates as follows: upon receiving the query request carrying the segment ID from the message tracing unit, the segment table maintaining unit queries the segment table in the storage unit for the data segment corresponding to the segment ID: if the segment table saves the data segment, the segment table maintaining unit sends a query success carrying the queried data segment to the message tracing unit; otherwise, the segment table maintaining unit returns a query failure to the message tracing unit; upon receiving an add request carrying the segment ID and the corresponding data segment from the message tracing unit, the segment table maintaining unit adds the segment ID and data segment carried in the request to the segment table;

the segment transmitting unit, which operates as follows: upon receiving a segment from the message tracing unit, the segment transmitting unit constructs and returns a download response carrying the data segment received from the message tracing unit to the download requester.

In the solution mentioned above, the data segment contains n (an integer greater than 1) data sub-segments, and the download request or download response also carries a data sub-segment ID. The message tracing unit is further used to: upon receiving a download request carrying a data sub-segment ID, send a transmit request carrying the data sub-segment ID to the segment transmitting unit; upon receiving a download response carrying the data sub-segment ID and the corresponding data sub-segment, buffer the data sub-segment until the n sub-segments are assembled into a complete data segment and send an add request carrying the segment ID and data segment to the segment table maintaining unit.

The segment transmitting unit is further used to: upon receiving a transmit request carrying a data sub-segment ID from the message tracing unit, construct and return a download response carrying the data sub-segment corresponding to the data sub-segment ID to the download requester until n data sub-segments of the data segment are returned.

In the solution mentioned above, the segment table also records the latest visit time of each segment; the segment table maintaining unit is further used to: after querying the segment table for the data segment corresponding to the segment ID in the download request successfully, take the current time as the latest visit time of the queried data segment and record the time in the segment table; when adding the segment ID and data segment in the add request to the segment table, take the current time as the latest visit time of the newly-added data segment and record the time in the segment table.

In the solution mentioned above, the apparatus further comprises: the first segment table aging unit, which configures the data segment aging time and the segment table traversal period and operates as follows: when the set traversal period reaches, the first segment table aging unit sends a time query request to the segment table maintaining unit, receives the latest visit time of each data segment, and checks whether the difference between the current time and the latest visit time is greater than the aging time: if yes, the first segment table aging unit sends a delete request to the segment table maintaining unit; if not, no processing is performed.

The segment table maintaining unit, which is further used to: upon receiving the time query request from the first segment table aging unit, query the segment table in the storage unit, and send the latest visit time of each queried data segment to the first segment table aging unit; upon receiving the delete request from the first segment table aging unit, delete the corresponding data segment entry from the segment table according to the delete request.

In the solution mentioned above, the apparatus further comprises:

the second segment table aging unit, which configures the storage capacity threshold for the segment table and operates as follows: before adding the data segment in the download response to the segment table, the second segment table aging unit checks whether the current total storage capacity of the segment table is greater than the set threshold: if yes, the second segment table aging unit determines the data segment with the oldest visit time according to the latest visit time and sends a delete request to the segment table maintaining unit;

the segment table maintaining unit, which is further used to: receive the delete request from the second segment table aging unit, and delete the corresponding entry from the segment table according to the delete request.

To achieve the third objective, the present invention proposes the following solution: a method for processing packets on a network device, which is used to forward packets at Layer 2 or Layer 3. When receiving a packet from the first user, the method saves the data encapsulated in the data packet, and then forwards the packet according to the destination address of the packet.

When the method finds that a second user requests the data, the method encapsulates the saved data in data packets and sends the data packets to the second user.

To achieve the fourth objective, the present invention proposes the following solution: a network device, which is used to forward packets at Layer 2 or Layer 3 in the network, comprising:

the data processing module, which is used to extract data from the pre-defined types of packets and forward the packets according to their destination addresses;

the monitoring and responding module, which monitors the data requests from users, encapsulates the conforming data saved locally in data packets, and sends the packets to the users.

To sum up, the present invention proposes a method and apparatus for processing data download in a P2P network. As segment tables are established to save the uploaded data segments, the data segments can be obtained from the segment tables and then directly supplied to the download requester. In this way, the present invention avoids repeated upload, reduces upload traffic in the network, decreases network bandwidth occupied by traffic, and thus improves the overall network performance. The invention also proposes a packet processing method and a network device. The network device can save the data uploaded by the first user. When a second user requests the data, the network device can encapsulate the saved data in data packets and send the data packets to the second user, and the first user does not need to send the data to the second user. In this way, the present invention reduces upload traffic in the network, decreases network bandwidth occupied by traffic, and thus improves the overall network performance.

DETAILED DESCRIPTION OF THE INVENTION

For a better understanding of the objectives, technical solutions, and advantages of the present invention, the following part introduces the present invention more detailed by referencing the drawings and an embodiment.

In the present invention, the idea is to process packets as follows: upon receiving a packet from the first user, the network device saves the data encapsulated in the data packet, and then forwards the packet according to the destination address of the packet. In this way, when the network device finds that a second user requests the data, the network device encapsulates the saved data in data packets and sends the data packets to the second user. As a result, the first user does not need to send the data to the second user. Herein, the network device (switch or router) can forward packets at Layer 2 or Layer 3 in the network, the first user can be regarded as the data provider, and the second user can be regarded as the data downloader.

As an embodiment, the following part firstly analyzes how the current P2P technology processes data download.

Figure 1:
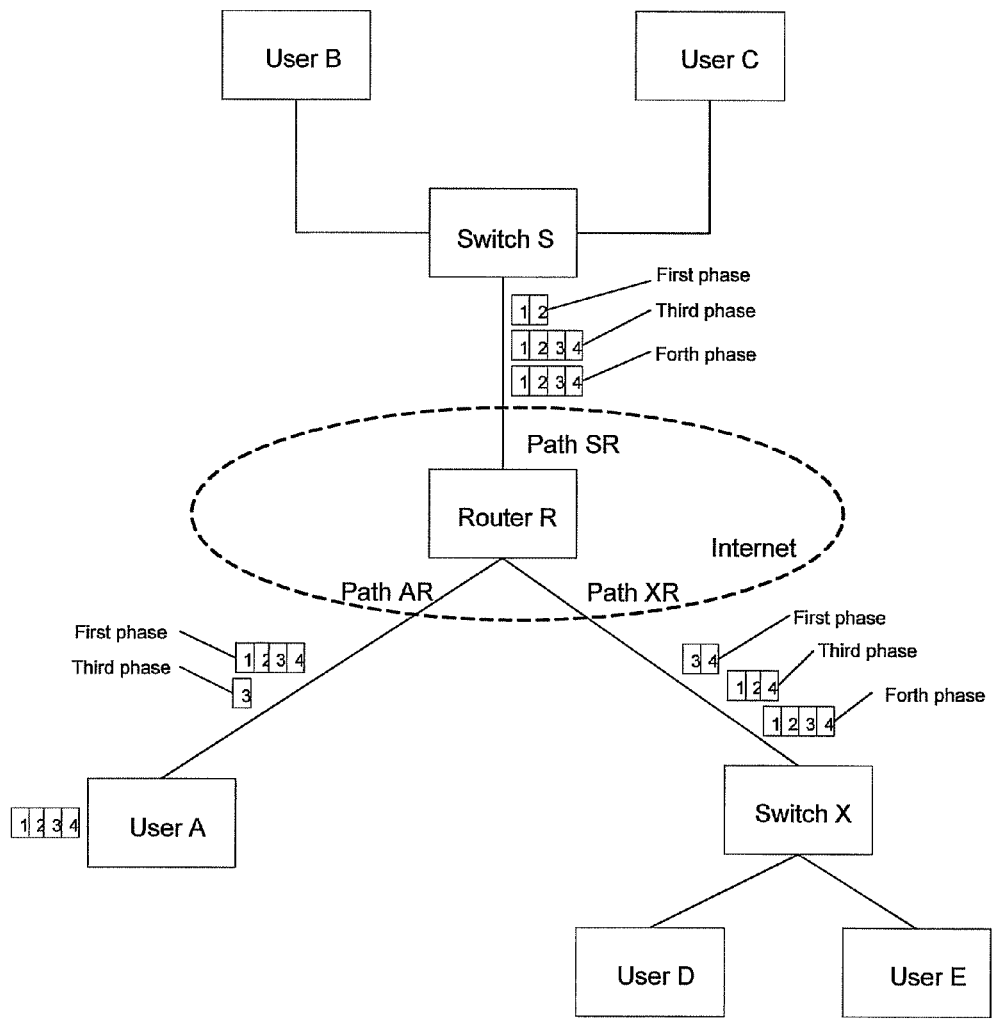
FIG. 1 is a schematic diagram illustrating the network where a simple P2P application is deployed.

FIG. 1 is a schematic diagram illustrating the network where a simple P2P application is deployed. As shown in FIG. 1, suppose user A has a file, the file is divided into four segments, and users B through E need to download the file. Additionally, user B and user C are interconnected through switch S, user D and user E are interconnected through switch X, and user A, switch S, and switch X all connect to router R in the Internet. Users B through E get the four segments of the file from user A following the four phases.

In the first phase, users B through E respectively request one of the four data segments. Data segments 1 through 4 travel on path AR, data segments 1 and 2 reach users B and C through router R, and data segments 3 and 4 reach users D and E through router R. That is, data segments 1 through 2 will travel on path SR, data segments 3 and 4 will travel on path XR. In the first phase, user B gets data segment 1, user C gets data segment 2, user D gets data segment 4, and user E gets data segment 3.

In the second phase, user B and user C exchange data segments 1 and 2 through switch S, and user D and user E exchange data segments 3 and 4 through switch X. In this phase, no traffic increment occurs on paths AR, SR, and XR.

In the third phase, user B requests data segment 3 from user A, user C requests data segment 4 from user E, user D requests data segment 1 from user B, and user E requests data segment 2 from user C. Then, data segment 3 will travel on path AR, data segments 1 through 4 will travel on path SR, and data segments 1, 2, and 4 will travel on path XR.

In the fourth phase, user B requests data segment 4 from user D, user C requests data segment 3 from user E, user D requests data segment 2 from user B, and user E requests data segment 1 from user C. Then, data segments 1 through 4 will travel on path SR, and data segments 1 through 4 will travel on path XR.

After the four phases mentioned above, users B through E all get the four segments of the file. However, there are repeated upload/download data segments on paths AR, SR, and XR. If a segment table is set up in the table to save data segments, when a user needs to download a data segment, the user can directly get the data segment from the segment table, and the user having the data segment does not need to upload the data segment again. In this way, the total P2P traffic in the network is greatly reduced, and the P2P network performance is improved.

To this end, the present invent proposes the following technical solution. A segment table is set up in the P2P network to save segment IDs and the corresponding data segments. Upon receiving a download request carrying the download requester, the download provider, and the segment ID, the method queries the segment table for the data segment corresponding to the segment ID carried in the download request. If the data segment exists, the method constructs and returns a download response carrying the queried data segment to the download requester, and drops the received download request; otherwise, the method forwards the download request to the download provider. Upon receiving a download response carrying the download requester, the download provider, the segment ID, and the data segment, the method queries the segment table for the data segment corresponding to the segment ID carried in the download response. If the data segment exists, the method forwards the received download response to the download requester; otherwise, the method adds the segment ID and the data segment into the segment table, and then forwards the download response to the download requester.

The solution mentioned above of the present invention can be applied to any network device, such as a router or switch, in a P2P network, or be applied to a standalone device or apparatus. That is, the solution can be integrated with functions of the current network devices, or set independently.

In actual applications, a data segment can be further divided into n (an integer greater than 1) data sub-segments, and the download request or response also carries a data sub-segment ID. In this case, the constructing and returning a download response carrying the queried data segment to the download requester comprises: upon receiving each download request carrying a data sub-segment ID, the method constructs a download response carrying the data sub-segment corresponding to the data sub-segment ID in the download request and returns the download response to the download requester.

Accordingly, the adding the segment ID and data segment in the download response to the segment table comprises: upon receiving a download response carrying a data sub-segment ID and the corresponding data sub-segment, the method buffers the data sub-segment until the n data sub-segments are assembled into a complete data segment, and then saves the data segment and segment ID into the segment table.

In actual applications, to limit the storage space occupied by the segment table, the method can set parameters such as the latest visit time, the segment aging time, and the segment table traversal period.

If the latest visit time is set for each data segment, the latest visit time of each segment is recorded in the segment table. That is, when the data segment corresponding to the segment ID in the download request is queried in the segment table, the current time can be taken as the latest visit time of the queried data segment and recoded in the segment table. Additionally, when the data segment in the download response is added to the segment table, the current time can be taken as the latest visit time of the newly-added data segment and be recorded in the segment table.

If the data segment aging time and segment table traversal period are also set at the same time, when the set traversal period reaches, the latest visit time of each data segment is queried. If the difference between the current time and the latest visit time is greater than the aging time, the corresponding data segment entry is deleted from the segment table; otherwise, no processing is performed.

Alternatively, the segment table can be aged using other methods. For example, the storage capacity threshold can be set for the segment table. Before adding the data segment in the download response to the segment table, whether the current total storage capacity of the segment table is greater than the set threshold is checked. If yes, the data segment with the oldest visit time is determined and then the corresponding entry is deleted from the segment table. In actual applications, the method can also delete a random entry instead of the entry of the data segment with the oldest visit time to limit the storage space occupied by the segment table.

For better understanding of the proposal of the present invention, the following part describes the proposal through a preferred embodiment.

In this embodiment, suppose that the structure of the P2P network is as shown in FIG. 1. In the network, user A has a file, the file is divided into four data segments, and users B through E need to download the file. Additionally, user B and user C are interconnected through switch S, user D and user E are interconnected through switch X, and user A, switch S, and switch X all connect to router R in the Internet.

In this embodiment, further suppose the P2P application is BT, the download request is a request message, which carries the download requester, the download provider, and the segment ID, and the download response is a piece message, which carries the download requester, the download provider, the segment ID, and the data segment. Of course, in actual applications, the download requester and download provider of the BT application may exchange other messages, such as handshake, bitfield, interested, and unchoke, which are not related to the proposal of the embodiment and thus are not detailed. Additionally, the download requester and download provider in the request or piece message said in the embodiment can be identified by device IP address or port number, and the segment ID can be a key value, which can contain the hashed value calculated using an algorithm (SHA-1, for example) for the data segment and the peer_id of the user possessing the data segment. The segment table set in the embodiment is as shown in Table 1.

TABLE 1

| Segment ID (key) | Data segment length | Latest visit time | Data segment |
|---|---|---|---|
| 40 bytes | 4 bytes | 4 bytes | 128 bytes |

In the table, the segment ID field has the same meaning as the segment ID in the request or piece message. The data segment length indicates the number of bytes in a data segment, 128 k bytes, for example. The latest visit time field indicates the latest time when the corresponding data segment was visited. In actual applications, if a data segment contains n (an integer greater than 1) data sub-segments and the request or piece message also carries a data sub-segment ID, the segment table also records information about data sub-segments, such as the block field indicating the data sub-segment length. How a segment table is set depends on the actual applications for the purpose of facilitating data segment saving and querying, and is not described here.

Figure 2:
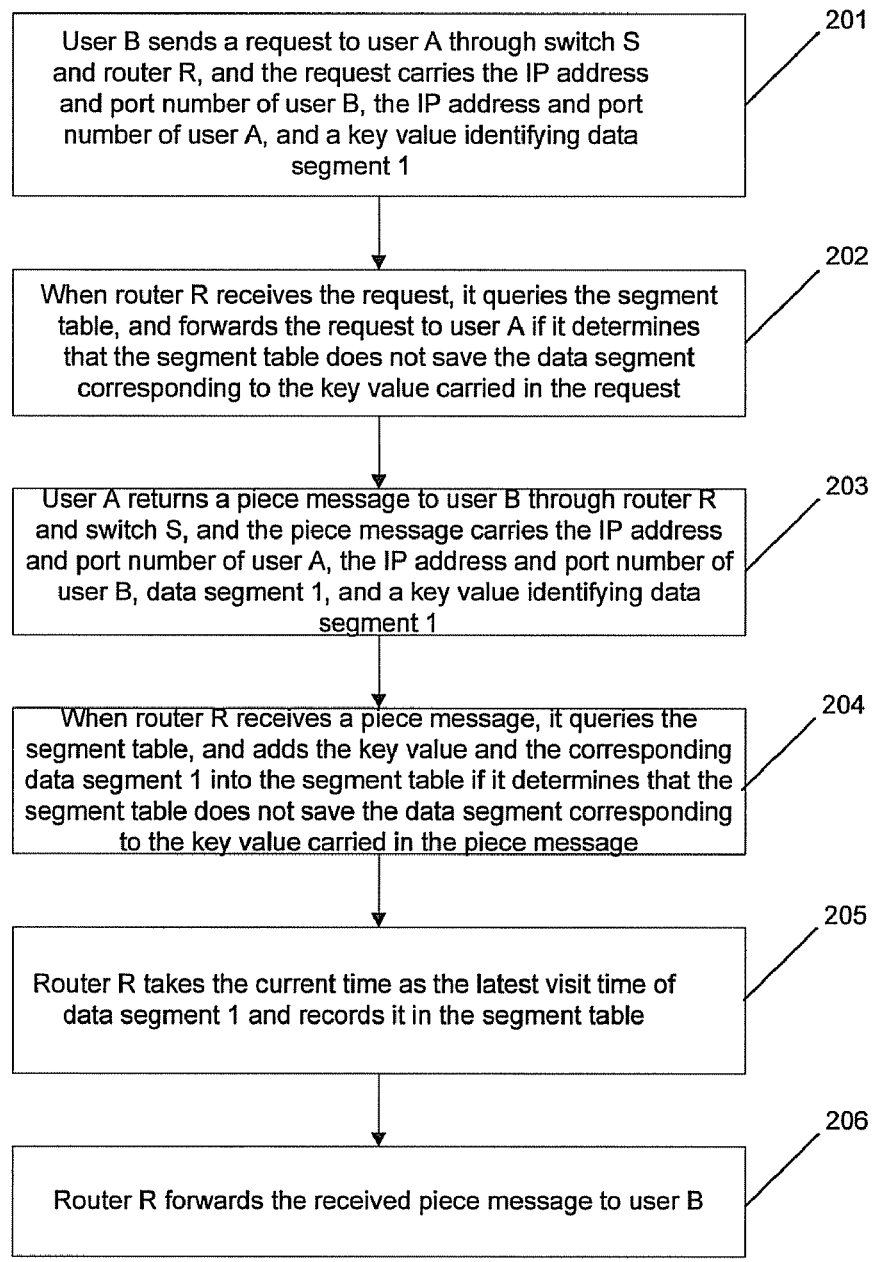
FIG. 2 is a flow chart illustrating how user B requests data segment 1 from user A in an embodiment of the present invention.

FIG. 2 is a flow chart illustrating how user B requests data segment 1 from user A in the embodiment of the present invention. In the embodiment, suppose that the solution is implemented on router R, and the segment table is saved in router R. When user A provides a file for a user requesting the file for the first time, the segment table does not save any data segment. As shown in FIG. 2, user B requests data segment 1 from user A following these steps.

In step 201, user B sends a request to user A through switch S and router R, and the request carries the IP address and port number of user B, the IP address and port number of user A, and a key value identifying data segment 1.

Here, the key value of data segment 1 is the segment ID of data segment 1. Additionally, in actual applications, if the data segment is divided into multiple data sub-segments, the request can also carry the ID of a certain data sub-segment.

In step 202, when router R receives the request, it queries the segment table, and forwards the request to user A if it determines that the segment table does not save the data segment corresponding to the key value carried in the request.

In actual applications, router R receives not only requests, but also other messages, such as handshake messages, bitfield messages, interested messages, and unchoke messages. In this case, router R needs to identify the requests among various messages. The current technologies can be used to identify requests, and thus are not described here.

In step 203, user A returns a piece message to user B through router R and switch S, and the piece message carries the IP address and port number of user A, the IP address and port number of user B, data segment 1, and a key value identifying data segment 1.

In actual applications, if the request also carries a data sub-segment ID, then user A encapsulates only one data sub-segment corresponding to the data sub-segment ID in a piece message, that is, the whole data segment needs to be returned to user B in multiple piece messages.

In step 204, when router R receives a piece message, it queries the segment table, and adds the key value and the corresponding data segment 1 into the segment table if it determines that the segment table does not save the data segment corresponding to the key value carried in the piece message.

In actual applications, if the data segment is divided into multiple data sub-segments, the piece message received by router R carries one data sub-segment of the data segment. In this case, router R can buffer the received data sub-segment, and then receives other piece messages. When it assembles the received data sub-segments into a complete data segment, it adds the assembled data segment and data segment ID (key value) into the segment table.

In step 205, router R takes the current time as the latest visit time of data segment 1 and records it in the segment table.

In step 206, router R forwards the received piece message to user B.

Through steps 201 to 206, the segment table can save data segment 1 uploaded by user A. In this way, if another user needs to download data segment 1 from user A, user A does not need to upload data segment 1 again; instead, router R directly forwards data segment 1 to the user.

Figure 3:
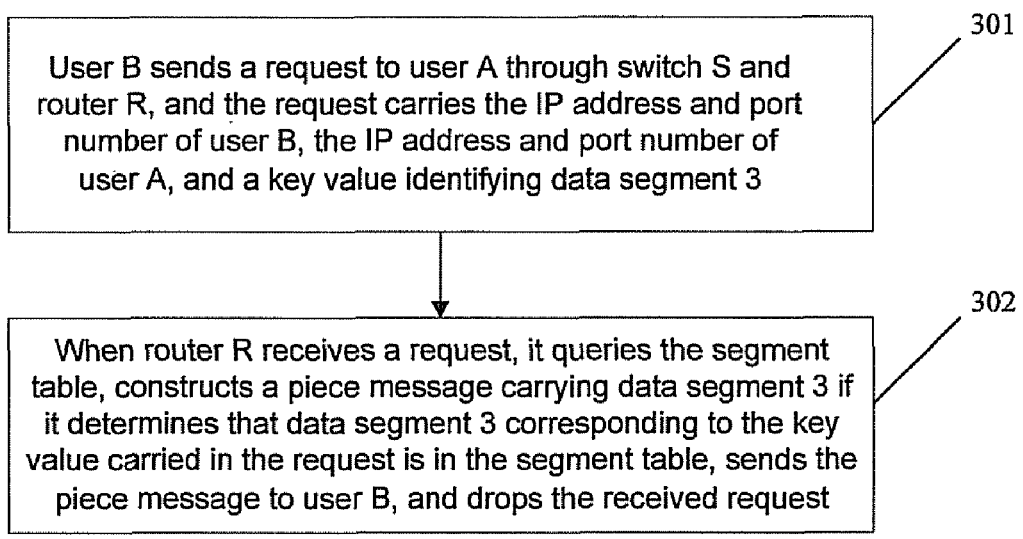
FIG. 3 is a flow chart illustrating how user B requests data segment 3 from user A in an embodiment of the present invention.

FIG. 2 shows the situation when the segment table has not saved the data segment that the download requester needs. Suppose that data segments 1 and 3 have been saved in the segment table. In this case, user B requests data segment 3 from user A. The flow chart is as shown in FIG. 3, including the following.

In step 301, user B sends a request to user A through switch S and router R, and the request carries the IP address and port number of user B, the IP address and port number of user A, and a key value identifying data segment 3.

This step is similar to step 201, and thus not detailed here.

In step 302, when router R receives a request, it queries the segment table, constructs a piece message carrying data segment 3 if it determines that data segment 3 corresponding to the key value carried in the request is in the segment table, sends the piece message to user B, and drops the received request.

That is, even though router R receives the request sent to user A in this step, router R does not need to forward the request to user A because the data segment 3 requested by user B is queried in the segment table. Thus, user A does not receive the request from user B and thus does not upload data segment 3; user B can receive a piece message carrying data segment 3, and the requirement for data segment 3 is satisfied.

Of course, if the request in step 301 also carries a data sub-segment ID, router R will construct multiple piece messages, each of which returns only one data sub-segment to user B, that is, the whole data segment needs to be returned to user B in multiple piece messages.

Figure 4:
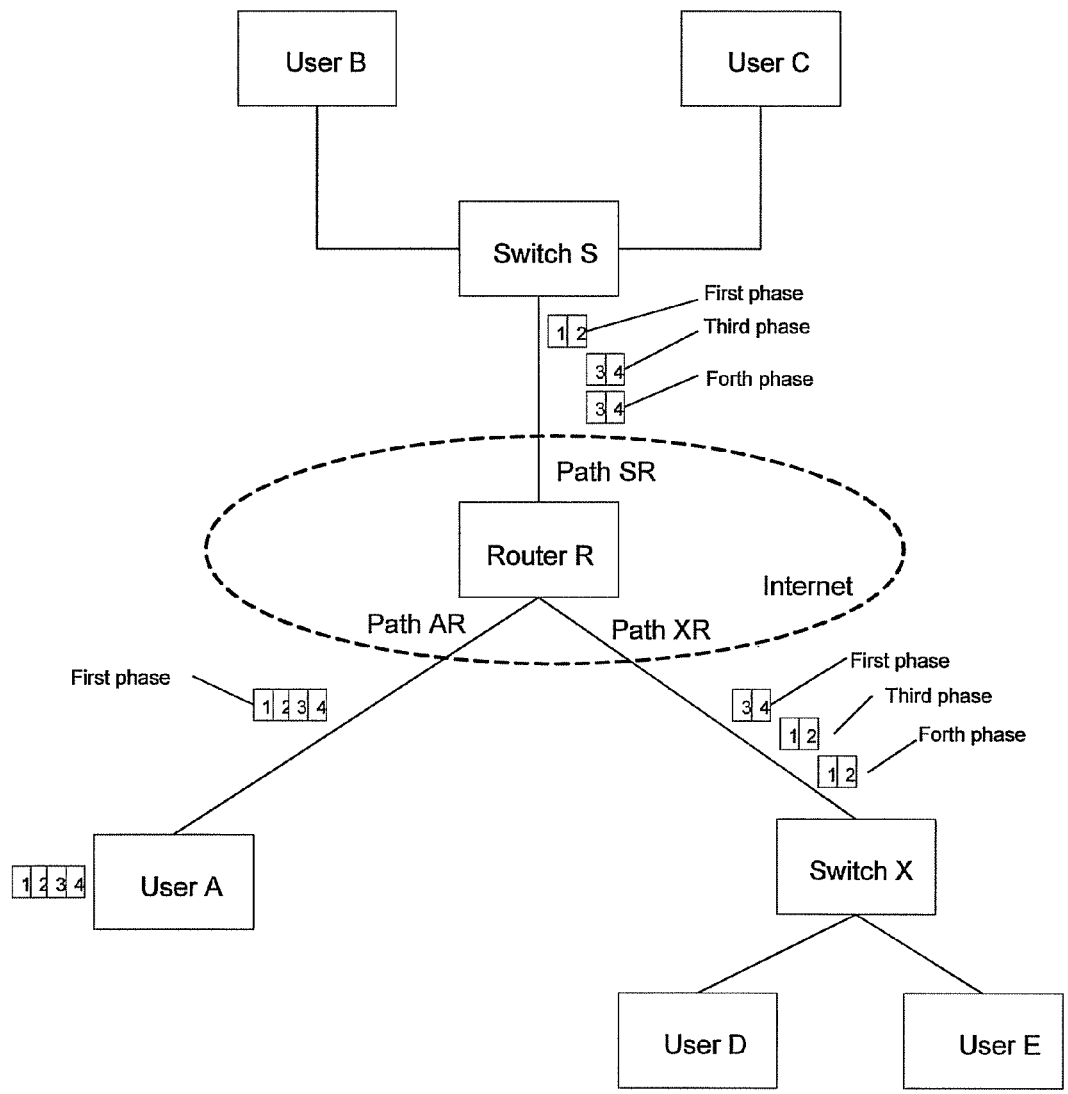
FIG. 4 is a schematic diagram illustrating data segments on each path in the network of an embodiment of the present invention.

FIG. 2 and FIG. 3 are flow charts illustrating how user B requests data segments 1 and 3 from user A. If the data is downloaded following the four phases shown in FIG. 1, the other segments must also be downloaded and processed as shown in FIG. 1. With the solution of the embodiment deployed, the data segments on each path in the network are as shown in FIG. 4. In the third phase, segment 3 is not repeatedly uploaded over path AR, data segments 1 and 2 are not repeatedly uploaded over path SR, and data segment 4 is not repeatedly uploaded over path XR; in the fourth phase, data segments 1 and 2 are not repeatedly uploaded over path SR, and data segments 3 and 4 are not repeatedly uploaded over path XR.

On the other hand, in the embodiment, the segment table can be aged. The detailed aging method is as mentioned above, and is not described here.

In the embodiment, the uploaded data segments are saved in the segment table and can be directly transmitted to download requester, and the download request does not need to be transmitted to the download provider. In this way, the present invention avoids repeated traffic upload, reduces upload traffic in the network, decreases network bandwidth occupied by P2P traffic, and thus improves the overall network performance.

In accordance with the method of the present invention, a network device is provided to forward packets at Layer 2 or Layer 3 in the network. The network device comprises the data processing module and the monitoring and responding module, wherein:

the data processing module is used to extract data from the pre-defined types of packets and forward the packets according to their destination addresses;

the monitoring and responding module monitors the data requests from users, encapsulates the conforming data saved locally in data packets, and sends the packets to the users.

That is, when the network device receives packets from the first user, it can save the data encapsulated in the packets; when it finds that a second user requests the data, it can encapsulate the saved data in a data packet and send it to the second user. As a result, the first user does not need to send the data to the second user again. Herein, the network device (switch or router) can forward packets at Layer 2 or Layer 3 in the network, the first user can be regarded as the data provider, and the second user can be regarded as the data downloader.

Figure 5:
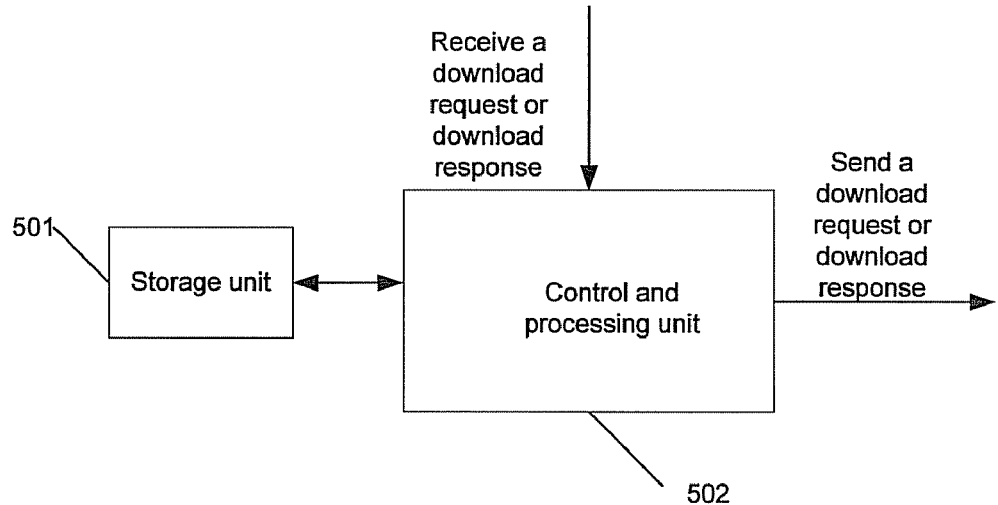
FIG. 5 is the block diagram of an apparatus for processing data download in a P2P network.

As an embodiment, suppose that the network device is used in a P2P network. The present invention provides an apparatus for processing data download in a P2P network. The block diagram of the apparatus is shown in FIG. 5. The apparatus for processing data download in a P2P network in the present invention comprises:

the storage unit 501, which saves the segment table mapping segment IDs to data segments;

the control and processing unit 502, which operates as follows: upon receiving a download request carrying the download requester, the download provider, and the segment ID, the control and processing unit 502 queries the segment table in the storage unit 501 for the data segment corresponding to the segment ID carried in the download request. If the data segment exists, the control and processing unit 502 constructs and returns a download response carrying the queried data segment to the download requester, and drops the received download request; otherwise, the control and processing unit 502 forwards the download request to the download provider. Upon receiving a download response carrying the download requester, the download provider, the segment ID, and the data segment, the control and processing unit 502 queries the segment table in the storage unit 501 for the data segment corresponding to the segment ID carried in the download response. If the data segment exists, the control and processing unit 502 forwards the received download response to the download requester; otherwise, the control and processing unit 502 adds the segment ID and data segment into the segment table, and then forwards the download response to the download requester.

Figure 6:
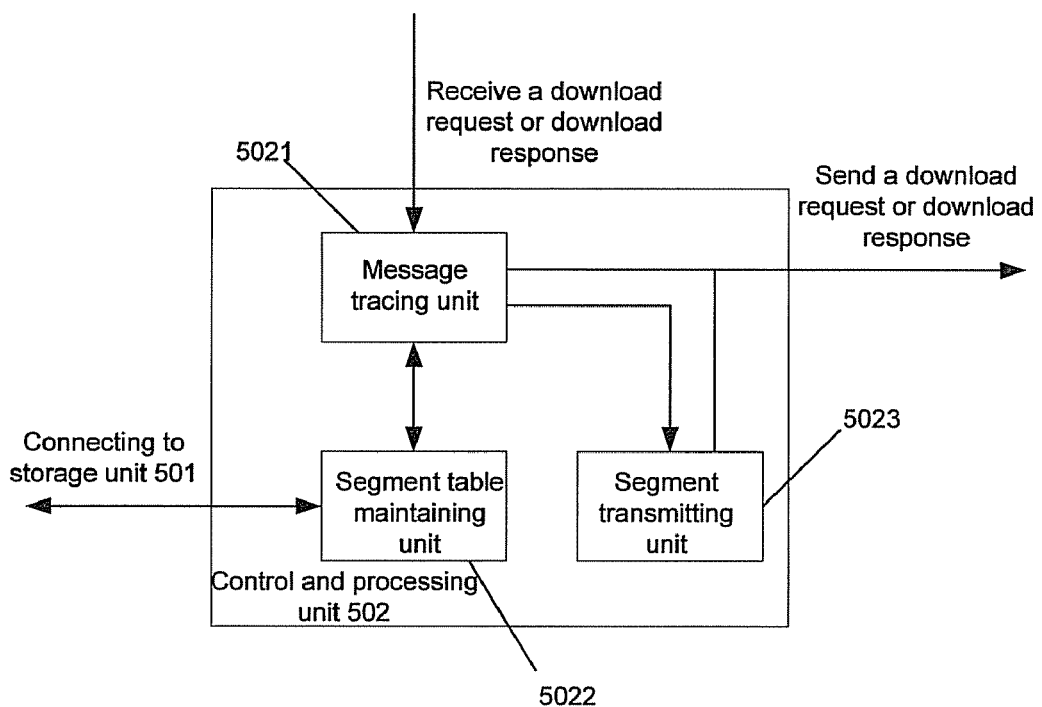
FIG. 6 is an embodiment of the internal structure of control and processing unit 502 in the apparatus of the present invention.

The block diagram of the control and processing unit 502 is as shown in FIG. 6, comprising:

the message tracing unit 5021, which operates as follows: upon receiving a download request carrying the download requester, the download provider, and the segment ID, the message tracing unit 5021 sends a query request carrying the segment ID to the segment table maintaining unit 5022: if the message tracing unit 5021 receives a query success message with the queried data segment from the segment table maintaining unit 5022, the message tracing unit 5021 sends the returned data segment to the segment transmitting unit 5023, and drops the received download request; if the message tracing unit 5021 receives a query failure message from the segment table maintaining unit 5022, the message tracing unit 5021 forwards the download request to the download provider. Upon receiving a download response carrying the download requester, the download provider, the segment ID, and the data segment, the message tracing unit 5021 sends a query request carrying the segment ID to the segment table maintaining unit 5022: if the message tracing unit 5021 receives a query success message from the segment table maintaining unit 5022, the message tracing unit 5021 forwards the received response to the download requester; if the message tracing unit 5021 receives a query failure message from the segment table maintaining unit 5022, the message tracing unit 5021 sends an add request carrying the segment ID and data segment in the received response to the segment table maintaining unit 5022, and forwards the received download response to the download requester;

the segment table maintaining unit 5022, which operates as follows: upon receiving the query request carrying the segment ID from the message tracing unit 5021, the segment table maintaining unit 5022 queries the segment table in the storage unit 501 for the data segment corresponding to the segment ID: if the segment table saves the data segment, the segment table maintaining unit 5022 sends a query success carrying the queried data segment to the message tracing unit 5021; otherwise, the segment table maintaining unit 5022 returns a query failure; upon receiving an add request carrying the segment ID and the corresponding data segment from the message tracing unit 5021, the segment table maintaining unit 5022 adds the segment ID and data segment carried in the request to the segment table;

the segment transmitting unit 5023, which operates as follows: upon receiving a segment from the message tracing unit 5021, the segment transmitting unit 5023 constructs and returns a download response carrying the data segment received from the message tracing unit 5021 to the download requester.

In actual applications, if the data segment contains n (an integer greater than 1) data sub-segments and the download request or download response also carries a data sub-segment ID, the message tracing unit 5201 is further used to: upon receiving a download request carrying a data sub-segment ID, send a transmit request carrying the data sub-segment ID to the segment transmitting unit 5023; upon receiving a download response carrying the data sub-segment ID and the corresponding data sub-segment, buffer the data sub-segment until the n sub-segments are assembled into a complete data segment and send an add request carrying the segment ID and data segment to the segment table maintaining unit 5022.

Accordingly, the segment transmitting unit 5023 is further used to: upon receiving a transmit request carrying a data sub-segment ID from the message tracing unit 5021, construct and return a download response carrying the data sub-segment corresponding to the data sub-segment ID to the download requester until n data sub-segments of the data segment are returned.

In actual applications, if the method mentioned above is the same, the segment table also records the latest visit time of each segment. In this case, the segment table maintaining unit 5022 is further used to: after querying the segment table for the data segment corresponding to the segment ID in the download request successfully, take the current time as the latest visit time of the queried data segment and record the time in the segment table; when adding the segment ID and data segment in the add request to the segment table, take the current time as the latest visit time of the newly-added data segment and record the time in the segment table.

Figure 7:
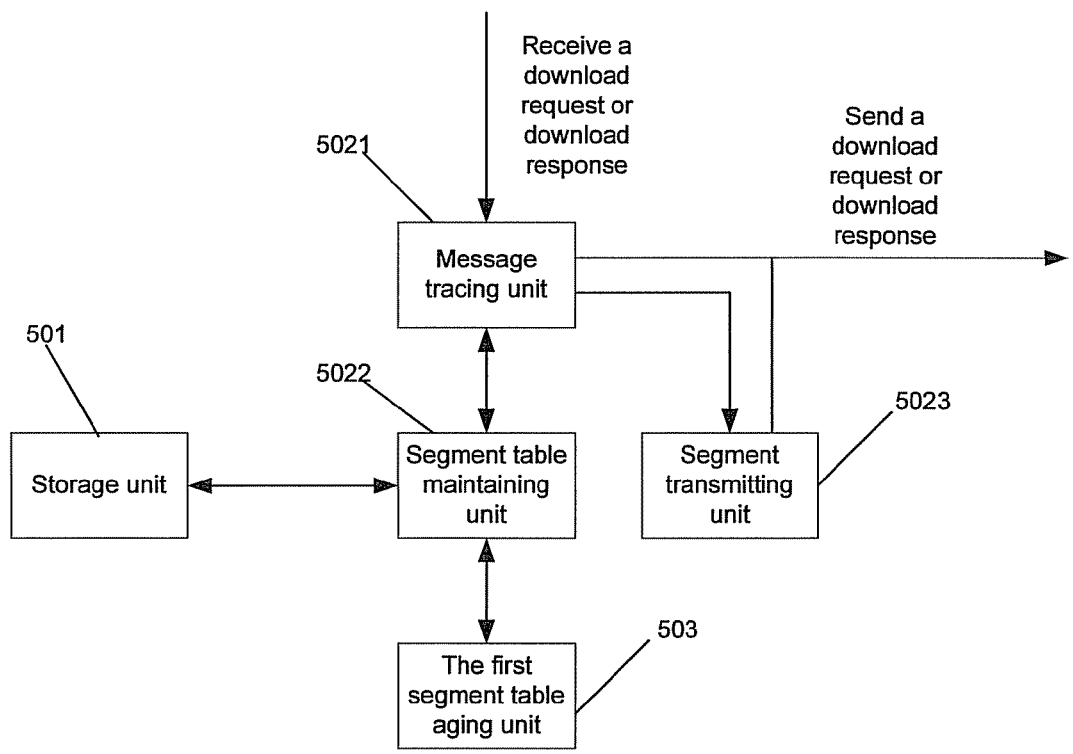
FIG. 7 is a schematic diagram illustrating an embodiment of the apparatus of the present invention.

FIG. 7 is a schematic diagram illustrating the embodiment of the apparatus of the present invention. As shown in FIG. 7, the apparatus comprises: the storage unit 501, the message tracing unit 5021, the segment table maintaining unit 5022, the segment transmitting unit 5023, and the first segment table aging unit 503. Of them, the storage unit 501, the message tracing unit 5021, and the segment transmitting unit 5023 are the same as shown in FIG. 5 and FIG. 6, and thus not described here. The difference is that the embodiment further comprises:

the first segment table aging unit 503, which configures the data segment aging time and the segment table traversal period and operates as follows: when the set traversal period reaches, the first segment table aging unit 503 sends a time query request to the segment table maintaining unit 5022 and receives the latest visit time of each data segment and checks whether the difference between the current time and the latest visit time is greater than the aging time: if yes, the first segment table aging unit 503 sends a delete request to the segment table maintaining unit 5022; if not, no processing is performed.

Additionally, besides the functions mentioned in FIG. 6, the segment table maintaining unit 5022 is further used to: upon receiving the time query request from the first segment table aging unit 503, query the segment table in the storage unit 501, and send the latest visit time of each queried data segment to the first segment table aging unit 503; upon receiving the delete request from the first segment table aging unit 503, delete the corresponding data segment entry from the segment table according to the delete request.

Of course, in actual applications, the segment table may be aged in another way, for example, the second segment table aging unit, rather than the first segment table aging unit 503, can be used to age the segment table. The second segment table aging unit configures the storage capacity threshold for the segment table. Before adding the data segment in the download response to the segment table, the second segment table aging unit checks whether the current total storage capacity of the segment table is greater than the set threshold: if yes, the second segment table aging unit determines the data segment with the oldest visit time according to the latest visit time and sends a delete request to the segment table maintaining unit 5022.

Accordingly, the segment table maintaining unit 5022 is further used to: receive the delete request from the second segment table aging unit, and delete the corresponding entry from the segment table according to the delete request.

In actual applications, the apparatus in the embodiment can be configured on one or more network devices in the P2P network, or configured separately. In the embodiment, the segment table in the storage unit 501 saves the uploaded data segments and the data segments can be directly transmitted to the download requester. In this way, the embodiment avoids repeated upload, reduces upload traffic in the network, decreases network bandwidth occupied by P2P traffic, and thus improves the overall network performance.

Although an embodiment of the present invention and its advantages are described in detail, a person skilled in the art could make various alternations, additions, and omissions without departing from the spirit and scope of the present invention as defined by the appended claims.

What is claimed is:

1. A method for processing data download messages in a peer-to-peer network using a network device comprising:
  receiving, at a network device, a data download request message from a download requester, the data download request message comprising a download requester identifier, a download provider identifier and a first data segment identifier;
  determining whether a first data segment corresponding to the first data segment identifier is stored in a segment table in a storage unit of the network device; and
  if the first data segment is stored in the segment table, with the network device, sending the download requester a response message comprising the first data segment corresponding to the first data segment identifier, and not forwarding the download request to the download provider;
  in which, if the first data segment is not stored in the segment table, forwarding, with the network device, the download request to the download provider.

2. The method of claim 1, further comprising sending the data download request message to a download provider corresponding to the download provider identifier in the data download request message.

3. The method of claim 1, further comprising:
  receiving, at the network device, a data download response message from a download provider, the data download response message comprising the download requester identifier, the download provider identifier, a second data segment identifier, and a second data segment corresponding to the second data segment identifier;
  determining whether the second data segment is stored in the segment table;
  storing the second segment identifier and the second data segment into the segment table if the segment table does not contain the second data segment; and
  forwarding the data download response message to the download requester corresponding to the download requester identifier.

4. The method of claim 3, further comprising:
  receiving a number of data download response messages, each data download response message comprising the download requester identifier, the download provider identifier, the second data segment identifier, a data sub-segment identifier, and a data sub-segment corresponding to the data sub-segment identifier in which the second data segment includes a number of data sub-segments, each of the data sub-segments corresponding to one data sub-segment identifier;
  buffering each data sub-segment contained in each corresponding data download response message; and
  combining the buffered data sub-segments into the second data segment.

5. The method of claim 3, further comprising storing a latest visit time of the second data segment in the segment table, in which the latest visit time of the second data segment in the segment table is the time of receiving the data download response message.

6. The method of claim 5, further comprising:
  configuring a segment aging time and a segment table traversal period threshold;
  comparing the segment aging time to the difference between a current time and the latest visit time when the set traversal period reaches a value equal to the segment table traversal period threshold; and
  deleting the second data segment from the segment table when the difference between a current time and the latest visit time is greater than the segment aging time.

7. The method of claim 6, further comprising:
  configuring a storage capacity threshold for the segment table in which the segment table comprises a number of stored data segments, each stored data segment comprising a corresponding latest visit time;
  comparing current storage capacity to the storage capacity threshold;
  selecting an oldest stored data segment from the stored data segments based on the latest arrival time for each stored data segment if the current storage capacity is greater than the storage capacity threshold; and
  deleting the oldest stored data segment from the segment table.

8. The method of claim 1, in which the network device is a switch or a router.

9. The method of claim 1, further comprising dropping the data download request message if the first data segment is stored in the segment table.

10. An apparatus for processing data download messages in a peer-to-peer network comprising:
  a storage unit to store a segment table, in which the segment table comprises a number of data segment identifiers, a number of data segments each corresponding to one data segment identifier from the data segment identifiers, and a mapping between the data segment identifiers and the data segments;
  a processing unit to:
    receive a data download request message from a download requester, the data download request message comprising a download requester identifier, a download provider identifier, and a first data segment identifier,
    determine whether a first data segment corresponding to the first data segment identifier is stored in the segment table stored in the storage unit; and if the first data segment is stored in the segment table, send a first response message comprising the download requester identifier, the download provider identifier, the first data segment identifier, and the first data segment to the data requester, and not forward the download request to a download provider.

11. The apparatus of claim 10, in which the processing unit further:
receives, at the network device, a data download response message from a download provider, the data download response message comprising the download requester identifier, the download provider identifier, a second data segment identifier, and a second data segment;
determines whether the second data segment is stored in the segment table; and
stores the second data segment into the segment table if the segment table does not contain the second data segment.

12. The apparatus of claim 11, further comprising:
a message tracing unit to:
receive the data download request message;
send a first query request to a segment table maintaining unit, the query request comprising the first data segment identifier,
send the first data segment to a segment transmitting unit if the message tracing unit receives a first query success message comprising the first data segment corresponding to the first data segment identifier from the segment table maintaining unit, and
drop the data download request message.

13. The apparatus of claim 12, in which the segment table maintaining unit:
receives the first query request from the message tracing unit, the first query request comprising the first data segment identifier,
determines whether the first data segment corresponding to the first data segment identifier is stored in the segment table;
sends the first query success message to the message tracing unit if the first data segment is stored in the segment table, the first query success message comprising the first data segment; and
sends a first query failure message to the message tracing unit if the first data segment is not stored in the segment table.

14. The apparatus of claim 13, in which the message tracing unit further sends the data download request message to the download provider corresponding to the data download provider identifier if the segment table maintaining unit sends the first query failure message to the message tracing unit.

15. The apparatus of claim 11, further comprising a message tracing unit to:
receive the data download response message;
send a second query request to a segment table maintaining unit, the query request comprising the second data segment identifier,
send the data download response message to the download requester if the message tracing unit receives a second query success message from the segment table maintaining unit, and send a first add request to the segment table maintaining unit, the add request comprising the second data segment identifier and the second data segment if the message tracing unit receives a second query failure message from the segment table maintaining unit.

16. The apparatus of claim 15, further comprising a segment table maintaining unit to:
receive the second query request from the message tracing unit, the query request comprising the second data segment identifier,
determine whether the second data segment corresponding to the second data segment identifier is stored in the segment table;
send the second query success message to the message tracing unit if the second data segment is stored in the segment table, the second query success message comprising the second data segment; and
send the second query failure message to the message tracing unit if the second data segment is not stored in the segment table;
receive the first add request from the message tracing unit, the add request comprising the second data segment identifier and the request data segment; and
store the second data segment identifier and the second data segment in the segment table.

17. The apparatus of claim 12, in which the segment transmitting unit receives the first data segment from the message tracing unit and sends the first response message comprising the first data segment to the download requester corresponding to the download requester identifier.

18. The apparatus of claim 16, in which the message tracing unit further:
receives a number of data download response messages, each data download response message comprising the download requester identifier, the download provider identifier, the second data segment identifier, a data sub-segment identifier, and a data sub-segment corresponding to the data sub-segment identifier in which the second data segment comprises a number of data sub-segments, each of the data sub-segments corresponds to one data sub-segment identifier;
buffers each data sub-segment contained in each corresponding data download response message;
combines the one or more buffered data sub-segments into the second data segment; and
sends the third add request comprising the second data segment identifier and the second data segment to the segment table maintaining unit.

19. The apparatus of claim 18, in which the message tracing unit further:
receives the data download request message from the download requester, the data download request message further comprising a first data sub-segment identifier; and
sends a transmit request to the segment transmitting unit, the transmit request comprising the first data sub-segment identifier.

20. The apparatus of claim 19, in which the segment transmitting unit further:
receives the transmit request from the message tracing unit, the transmit request comprising the first data sub-segment identifier;
send a second response message comprising a first data sub-segment corresponding to the first data sub-segment identifier.

21. The apparatus of claim 16, in which the segment table maintaining unit further:
stores a current time as a first latest arrival time in the segment table for the first data segment corresponding to the first data segment identifier in the data download request message if the first query success is sent to the message tracing unit; and
stores the current time as a second latest arrival time in the segment table for the second data segment corresponding to the second data segment identifier in the data download response message if the second add request is sent to the segment table.

22. The apparatus of claim 21, further comprising a first segment table aging unit to:
   send a time query request comprising a queried data segment identifier to the segment table maintaining unit;
   receive a queried latest time arrival for the queried data segment corresponding to the queried data segment identifier from the segment table maintaining unit;
   compare the segment aging time to the difference between a current time and the queried latest visit time of the data segment if a set traversal period reaches a value equal to a segment table traversal period threshold; and
   send a first delete request to the segment table maintaining unit, the first delete request comprising a delete data segment identifier corresponding to the queried data segment identifier if the difference between the current time and the latest visit time is greater than the segment aging time.

23. The apparatus of claim 22, in which the segment table maintaining unit further:
   receives the time query request comprising the queried data segment identifier from the first segment table aging unit;
   sends the queried latest time arrival for the queried data segment corresponding to the queried data segment identifier to the first segment aging unit;
   receives the first delete request comprising delete data segment identifier; and
   deletes the delete data segment corresponding to the delete data segment identifier from segment table.

24. The apparatus of claim 22, further comprises a second segment table aging unit to:
   configure a storage capacity threshold for the segment table in which the segment table comprises a number of stored data segments, each stored data segment associated with the latest visit time;
   compare current storage capacity to the storage capacity threshold;
   select an oldest stored data segment from the stored data segments based on the latest arrival time for each stored data segment if the current storage capacity exceeds the storage capacity threshold; and
   send a second delete request to the segment maintaining unit, the second delete request comprising an oldest data segment identifier corresponding to the oldest stored data segment.

25. A method for processing packet transmission on a network device comprising:
   receiving, at a network device, a data packet from a first user across a network, the data packet comprising a destination address and encapsulated data, the encapsulated data comprising a first data segment;
   extracting the encapsulated data from the data packet;
   storing the first data segment in a storage unit on the network device;
   forwarding the data packet to a destination based on the destination address using one or more communication protocols;
   receiving, at the network device, a data download request message from a download requester, the data download request message comprising a download requester identifier, and a data segment identifier;
   if the data identifier identifies the first data segment stored in the storage unit on the network device, sending the download requester a response message comprising the first data segment corresponding to the data identifier, and not forwarding the download request to the first user;
   receiving, at the network device, a data download response message from the first user, the data download response message comprising the download requester identifier, the download provider identifier, a subsequent data segment identifier, and a subsequent data segment corresponding to the subsequent data segment identifier;
   determining whether the subsequent data segment is stored in the segment table;
   storing the subsequent segment identifier and the subsequent data segment in the segment table if the segment table does not contain the subsequent data segment; and
   forwarding the data download response message to the download requester corresponding to the download requester identifier.

26. A network device that forwards a data packet across a network comprising:
   a data processing module to extract data from a data packet sent from a download provider and forward the data packet based on a destination address, in which the data packet includes the destination address and comprises a first data segment; and
   a monitoring module to monitor a plurality of data requests received by the network device from a number of users, the data requests comprising a download requester identifier, and a first data segment identifier, access data saved in a storage unit, encapsulate the first data segment into the data packet, and send the data packet to the users, and not forward the download requests to the download provider,
   in which the data processing module receives, at the network device, a data download response message from the download provider, the data download response message comprising the download requester identifier, the download provider identifier, a subsequent data segment identifier, and a subsequent data segment;
   determines whether the subsequent data segment is stored in the segment table; and
   stores the subsequent data segment into the segment table if the segment table does not contain the subsequent data segment.

27. A method for processing data download messages in a network comprising:
   receiving a download response message comprising a data segment by an access device located at an edge of the network, from a core-edge direction to a first client, in which the access device provides access service for at least two clients;
   determining whether the data segment is cached in a storage unit of the access device;
   caching the data segment in the storage unit of the access device if the data segment is not cached in the storage unit of the access device;
   receiving a download request message from a second client from an edge-core direction to a core of the network, the download request message comprising a data segment identifier;
   determining whether the data segment corresponding to the data segment identifier is cached in the storage unit of the access device;
   if the first data segment is stored in the segment table, forwarding a download response message to the second client, the download response message comprising the data segment corresponding to the data segment identifier, and not forwarding the download request message to an intended recipient of the download request message.

* * * * *

UNITED STATES PATENT AND TRADEMARK OFFICE
CERTIFICATE OF CORRECTION

| | | |
|---|---|---|
| PATENT NO. | : 8,392,448 B2 | |
| APPLICATION NO. | : 12/646129 | |
| DATED | : March 5, 2013 | |
| INVENTOR(S) | : Changzhong Ge | |

It is certified that error appears in the above-identified patent and that said Letters Patent is hereby corrected as shown below:

In the Claims:

In column 18, line 29, in Claim 26, delete "provider," and insert -- provider; --, therefor.

Signed and Sealed this
Sixteenth Day of July, 2013

Teresa Stanek Rea
*Acting Director of the United States Patent and Trademark Office*